Dec. 2, 1947.  W. I. TREADWAY ET AL  2,431,972
FISHING ROD HANDLE
Filed Nov. 21, 1944
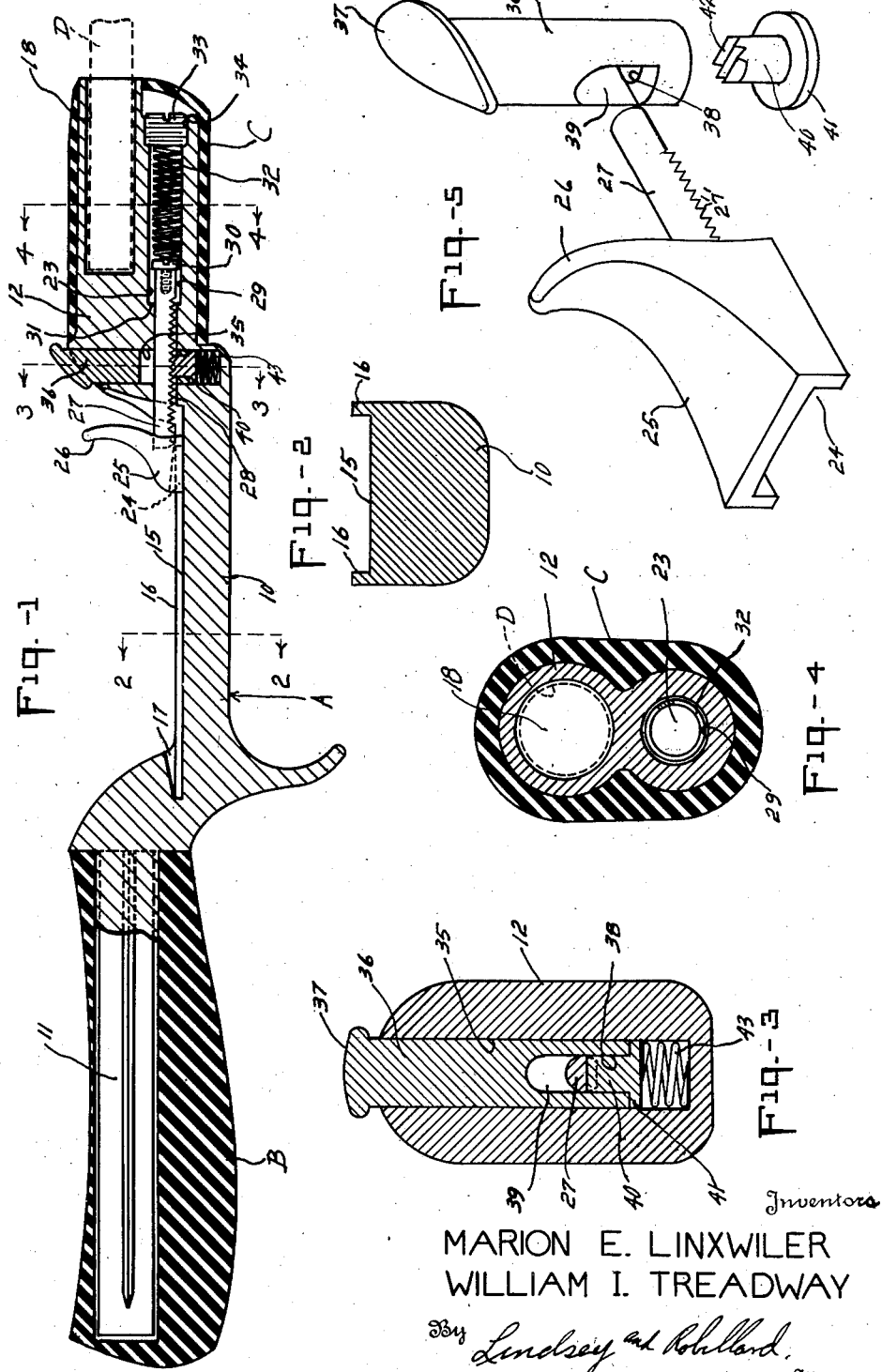
Inventors
MARION E. LINXWILER
WILLIAM I. TREADWAY
By Lindsey and Robillard
Attorneys Patented Dec. 2, 1947

2,431,972

UNITED STATES PATENT OFFICE 2,431,972

FISHING ROD HANDLE

William I. Treadway and Marion E. Linxwiler, Bristol, Conn., assignors to The Horton Manufacturing Company, Bristol, Conn., a corporation of Connecticut Application November 21, 1944, Serial No. 564,506

3 Claims. (Cl. 43—22)

This invention relates to fishing rod handles and has particular reference to means for detachably securing a fishing reel thereto.

An object of the invention is to provide a fishing reel handle with improved and novel means for detachably securing a fishing reel thereto, the arrangement being such that the reel may be very readily secured in place on the handle and the reel may be quickly disconnected therefrom by a simple manual operation, while at the same time accidental disconnection of the reel from the handle is effectively guarded against. The arrangement is such that when the reel is secured in place, the securing means cannot be jarred from securing position, as when the butt of the handle is struck against the ground or the like.

A further aim of the invention is to provide an improved arrangement of this sort which has various features of novelty and advantage and which is particularly characterized by its effectiveness in operation, its simplicity in construction and its economy in manufacture.

Other objects will be in part obvious and in part pointed out more in detail hereinafter.

The invention accordingly consists in the features of construction, combination of elements and arrangement of parts which will be exemplified in the construction hereafter set forth and the scope of the application of which will be indicated in the appended claims.

In the accompanying drawing wherein we have shown, for illustrative purposes, one embodiment which the present invention may take—

Figure 1 is a longitudinal sectional view through our improved fishing rod handle;

Fig. 2 is a transverse sectional view through the central portion of the handle, the same being taken substantially on line 2—2 of Fig. 1;

Fig. 3 is a transverse sectional view taken substantially on line 3—3 of Fig. 1;

Fig. 4 is a transverse sectional view through the forward end of the handle, the same being taken on line 4—4 of Fig. 1; and Fig. 5 is an exploded view showing, in perspective, the several parts of the means for securing the reel in place on the handle.

Referring to the drawing in detail, A denotes generally a main handle member or frame having an intermediate portion 10, a shank 11 extending rearwardly from the rear end of the intermediate portion, and a head or boss 12 extending forwardly from the front end of the intermediate portion. The member A may be cast or molded and is preferably made of an aluminum alloy. The intermediate portion 10 between its ends has a flat surface or seat 15 upon which the base plate of the reel (not shown) is adapted to rest. Along each side of the seat 15 is a longitudinally extending rib or flange 16. At the rear end of the seat 15 is a recess 17 in which the heel end of the base plate of the reel is adapted to engage. Fitting about the shank 11 is a rear hand grip B of suitable material, such as a molded plastic. Fitting about the head 12 is a front hand grip C also of suitable material. The head 12 has a socket 18 adapted to receive the butt end of a fishing pole D, the latter being shown in broken lines.

Referring now to the latch arrangement for securing the reel in place, 25 designates a latch member or slide mounted for sliding movement in the forward end of the channel which is formed by the seat 15 and the ribs 16. This slide has on its underside a recess 24 adapted to accommodate the toe end of the base plate of the reel. The slide also has an upwardly extending finger piece 26 for drawing the slide forwardly when it is desired to detach the reel from the handle. The slide is secured to the rear end of a ratchet bar 27 having transverse teeth 27' on its underside. The bar projects into a hole 23 extending longitudinally through the head 12 and located beneath the socket 18. The rear portion or bore 28 of this hole 23 is of such diameter that the bar 27 will slidably fit therein. The hole has an intermediate portion or bore 29 into which the forward end of the ratchet bar extends. The forward end of the bar carries a stop screw 30 adapted to engage the shoulder 31 between the bore portions 28 and 29 whereby rearward movement of the slide is limited. Located within the bore portion 29 is a coiled spring 32 which abuts at its rear end against the stop screw 30 and at its forward end against a plug 33 screwed into an enlarged bore 34 at the forward end of the hole 23.

Located in the rear portion of the head 12 and intersecting the bore portion 28 of the hole 23 is a vertical bore 35 which is open at its upper end and closed at its lower end. This bore 35 is preferably of circular cross section and accommodates a release plunger 36. The upper end of the release plunger has a head 37 against which the finger or thumb is adapted to be pressed when it is desired to release the latch. The plunger, at its lower end, has an axial hole 38 which opens into a transverse slot 39 through which the ratchet bar extends. The numeral 40 designates a pawl which is in the form of a stud having a shank portion slidably fitting in the hole 38 in the lower end of the plunger. The pawl has a flange 41 adapted to engage the lower end of the plunger. The pawl also has on its upper end transversely extending teeth 42 which are complementary to the teeth 27' of the ratchet bar so as to mesh therewith. In the bottom of the vertical bore 35 and beneath the pawl is a coiled spring 43 which normally urges the pawl into engagement with the ratchet bar.

It will be seen from the foregoing description taken in connection with the accompanying drawing that, with our improved arrangement, the fishing reel may be very quickly and readily secured in place on, and removed from, the handle. Assuming that the reel is in place and it is desired to remove the same, this may be done with facility by merely pressing forwardly on the finger or thumb piece 26 of the slide so as to draw the slide, together with the ratchet bar carried thereby, forwardly beyond the toe or forward end of the base plate of the reel. The reel may then be removed from the seat 15. The slide will be held in its forward position due to the interengagement between the teeth 27' and 42 on the ratchet bar and pawl respectively. When it is desired to secure the reel to the handle, it is merely necessary to place the base of the reel on the seat 15 with its heel end engaged in the recess 17 and then push downwardly on the release plunger 36, whereupon the spring 32 will force the slide 25 rearwardly into overlapping engagement with the toe end of the base plate of the reel. The plunger may now be released, whereupon it, together with the pawl 40, will be raised by the spring 43. It will be observed that the spring 32 normally urges the slide rearwardly into its reel locking position, and the slide is frictionally held in its locking position by the pawl 40 which is urged into engagement with the ratchet bar by the spring 43. Thus, the reel is securely held in position while, at the same time, the latching means may be readily manipulated to unlock it from place. In the event that the butt end of the handle should be jarred against the ground or any object, the force imparted to the slide 25 would be in a direction to move it further into its reel locking position. It will further be observed that the slide and the release plunger are so located that they may be very easily and readily manipulated by the thumb or fingers of the hand positioned about the forward grip C.

As many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

It is also to be understood that the language used in the following claims is intended to cover all of the generic and specific features of the invention herein described and all statements of the scope of the invention which, as a matter of language, might be said to fall therebetween.

We claim as our invention:

1. In a fishing rod handle, a handle having an intermediate portion constituting a seat for the base plate of a reel, a hand grip extending rearwardly from the rear end of the intermediate portion, and a head extending forwardly from the forward end of the intermediate portion; said head having a longitudinally extending bore disposed above the plane of said seat, a latching member comprising a slide and a ratchet bar extending forwardly therefrom and into said bore, said slide being adapted to overlie the toe end of the base plate of the reel when the slide is moved rearwardly into latching position, a spring normally urging said slide rearwardly into latching position, a pawl in said head and having teeth adapted to engage the teeth of said ratchet bar, a spring normally urging said pawl into engagement with the ratchet bar, and a release plunger for disengaging the pawl from the ratchet bar.

2. In a fishing rod handle, a handle having an intermediate portion constituting a seat for the base plate of a reel, a hand grip extending rearwardly from the rear end of the intermediate portion, and a head extending forwardly from the forward end of the intermediate portion; said head having a longitudinally extending bore disposed above the plane of said seat and a vertical bore intersecting said first bore adjacent the rear end of the latter, a slide at the forward end of said seat and adapted to overlie the toe end of the base plate of the reel, a ratchet bar fixed to said slide and extending forwardly therefrom into said longitudinally extending bore, a spring in said head forwardly of the bar and normally urging said bar and slide rearwardly, a pawl in said vertical bore below said bar and having teeth adapted to engage the teeth of the bar, a release plunger in said vertical bore and having a transverse slot through which said bar extends, and a spring beneath said pawl for urging said pawl into engagement with said bar and said release plunger to an upper position.

3. In a fishing rod handle, a handle having an intermediate portion provided with a flat seat for receiving the base plate of a reel, a hand grip portion extending rearwardly from the rear end of said intermediate portion, a head extending forwardly from the front end of said intermediate portion and having a socket adapted to receive the butt end of a fishing pole; said head having a longitudinally extending opening disposed above the plane of said seat and a vertical bore intersecting said opening adjacent the rear thereof, a slide at the forward end of said seat and adapted to overlie the toe end of the base plate of the reel to secure the same in position, a ratchet bar connected to said slide and extending forwardly therefrom into said opening and through said bore, a spring in the forward end of said opening bearing against the forward end of said bar for urging said slide rearwardly into latching position, a release plunger in said vertical bore having a transverse slot through which said bar extends and an axial hole at its lower end opening into said slot, a pawl having a body portion slidably mounted in said axial hole and provided at its upper end with teeth adapted to engage the teeth of said ratchet bar, said pawl having at its lower end a flange adapted to engage against the lower end of said plunger, and a spring in the bottom of said vertical bore and beneath said pawl and normally urging said pawl and plunger upwardly.

WILLIAM I. TREADWAY.
MARION E. LINXWILER.

REFERENCES CITED

The following references are of record in the file of this patent:

UNITED STATES PATENTS

| Number | Name | Date |
|---|---|---|
| 2,102,237 | Kinnear | Dec. 14, 1937 |
| 2,182,901 | Moulton | Dec. 12, 1939 |
| 2,289,216 | Seidel | July 7, 1942 |